UNITED STATES PATENT OFFICE 2,589,198

PROCESS FOR BREAKING OIL-IN-WATER EMULSIONS

Louis T. Monson, Los Angeles County, Calif., assignor to Petrolite Corporation, Ltd., Wilmington, Del., a corporation of Delaware No Drawing. Application April 12, 1950,
Serial No. 155,560

20 Claims. (Cl. 252—344)

This invention relates to a novel process for resolving or separating emulsions of the oil-in-water class. Such emulsions comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field waters containing small proportions of crude petroleum oil relatively stably dispersed in water or brine are representative oil-in-water emulsions.

Other oil-in-water emulsions include: steam cylinder emulsions, in which traces of lubricating oil are found dispersed in condensed steam from steam engines and steam pumps; wax-hexane-water emulsions, encountered in de-waxing operations in oil refining; butadiene tar-in-water emulsions, in the manufacture of butadiene from heavy naphtha by cracking in gas generators, and occurring particularly in the wash box waters of such systems; emulsions of "flux oil" in steam condensate, produced in the catalytic dehydrogenation of butylene to produce butadiene; styrene-in-water emulsions, in synthetic rubber plants; synthetic latex-in-water emulsions, in plants producing a copolymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol in the dehydration of natural gas.

In other industries and arts, emulsions of oily materials in water or other non-oily media are encountered, for example, in sewage disposal operations, synthetic resin emulsion paint formulation, milk and mayonnaise processing, marine ballast water disposal, furniture polish formulation. In cleaning the equipment used in processing such products, diluted oil-in-water emulsions are inadvertently, incidentally, or accidentally produced.

Essential oils comprise non-saponifiable materials like terpenes, ketones, and alcohols. They also contain saponifiable esters, or mixtures of non-saponifiable and saponifiable materials. Steam distillation and other production procedures sometimes cause oil-in-water emulsions to be produced, from which the valuable essential oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, or a mixture of non-saponifiable and saponifiable materials. The present application is, in part, concerned with the resolution of emulsions in which the dispersed phase consists of a certain class of non-saponifiable material, to wit, petroleum oil.

A second sub-genus comprises emulsions whose dispersed phases are saponifiable, such as the saponifiable oils and fats and fatty acids, and other saponifiable oily or fatty esters and the organic components of such esters to the extent such components are immiscible with aqueous media.

A third sub-genus possesses dispersed phases composed of a mixture of saponifiable and non-saponifiable materials. Emulsions produced from certain blended lubricating compositions containing both mineral and vegetable oil ingredients exemplify this sub-genus. Such emulsions are resolved by the present process, particularly when the proportion of dispersed phase is appreciably less than 20%.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced, contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million. Emulsions containing more than about 20% of oil phase are commonly of such stability as to be less responsive to the presently disclosed reagents, possibly because of the appreciable content of emulsifying agent present in such systems, whether intenionally incorporated for the purpose of stabilizing them, or not.

Although the present invention relates to emulsions containing as much as 20% dispersed oily material, many if not most of them, contain appreciably less than the proportion of dispersed phase. In fact, most of the emulsions encountered in the development of the invention have contained about 1% or less of dispersed phase. It is to such oil-in-water emulsions having dispersed phase volumes of the order of 1% or less that the present process is most particularly directed. This does not mean that any sharp line of demarcation exists, and that, for example, an emulsion containing 1.0% dispersed phase will respond to the process, whereas, one containing 1.1% of the same dispersed phase will remain unaffected; but that, in general, dispersed phase proportions of the order of 1% or less appear most favorable for the application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

Classifying the oil-in-water emulsions herein contemplated, on the basis of their dispersed phase, the first division would include emulsions containing up to 20% of dispersed phase. An intermediate group would contain up to 5% dispersed phase. The third, herein most important, and commonest class would comprise emulsions in which the proportion of dispersed phase is less than about 1% of the whole.

The present process is not believed to depend for its effectiveness on the application of any simple laws, because it has a high level of effectiveness when used to resolve emulsions of widely different composition, e. g., crude or refined petroleum in water or diethylene glycol, as well as emulsions of oily materials like animal or vegetable oils or synthetic oily materials, in water.

Some emulsions are by-products of manufacturing procedure, in which the composition of the emulsion and its ingredients is known. In many instances, however, the emulsions to be resolved are either naturally-occurring or are accidentally or unintentionally produced; or in any event, they do not result from a deliberate or premeditated emulsification procedure. In numerous instances, the emulsifying agent is unknown; and as a matter of fact, an emulsifying agent, in the conventional sense, may be felt to be absent. It is obviously very difficult or even impossible, to recommend a resolution procedure for the treatment of such latter emulsions, on the basis of theoretical knowledge. Many of the most important applications of the present process are concerned with the resolution of emulsions which are not the result of deliberate procedural operations, but which are either naturally-occurring or are accidentally, unintentionally, or unavoidably produced. Such emulsions are commonly of the most dilute type, and usually contain about 1% or less of dispersed phase, although concentrations up to 20% are herein contemplated.

The present invention relates particularly to such naturally-occurring or accidentally, unintentionally, or unavoidably produced emulsions, i. e., such emulsions as would not appear in industrial operations, if avoidable. It relates particularly to such emulsions wherein the dispersed phase comprises less than 20% of the whole. Such dilute and naturally-occurring or accidentally, unintentionally, or unavoidably produced emulsions of by-product character will be termed herein "dilute incidental" emulsions, to distinguish them from more concentrated emulsions and emulsions intentionally produced.

Applicability of the present process can be readily determined by direct trial on any emulsion, without reference to theoretical considerations. This fact facilitates its application to naturally-occurring emulsions, or to emulsions accidentally, unintentionally, or unavoidably produced; since no laboratory experimentation, to discover the nature of the emulsion components or of the emulsifying agent, is required.

The process which constitutes the present invention consists in subjecting an emulsion of the oil-in-water class, containing less than about 20% of dispersed phase, to the action of a reagent or demulsifier of the kind subsequently described, thereby causing the oil particles in the emulsion to coalesce sufficiently to rise to the surface (or to settle to the bottom, if the oil density is greater than the water density), when the mixture of emulsion and reagent is allowed to stand in a quiescent state after mixing or treatment of emulsion with demulsifier.

Compounds which I have found to be effective for the purpose described above belong to the general class of cyclic amidines, and in particular are substituted imidazolines, in which the imidazoline molecule contains at least one aliphatic, or cycloaliphatic hydrocarbon group containing from 8 to 32 carbon atoms. Cyclic imidazolines in which the 2-carbon atom is substituted by a long chain aliphatic hydrocarbon group are particularly easy to prepare and are very effective for the present use. However, it has been found that equally effective compounds, if not somewhat more effective in some instances, result when the aliphatic hydrocarbon group occurs as a substituent of one of the nitrogen atoms, or of a relatively small organic radical attached to one of the nitrogen atoms.

An important class of the reagents herein included as oil-in-water demulsifiers, may be represented by the following general formula:

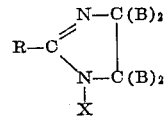

wherein B is hydrogen, $CH_3$, $C_2H_5$, $C_3H_7$, etc. and either R or X, or both, contain or consist of an aliphatic or cycloaliphatic radical containing from 8 to 32 carbon atoms.

Within this just recited class of reagents there is an important sub-class which may be represented by the following general formula:

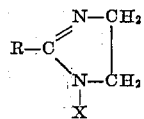

in which R and X have their previous significance.

In the most general classification of reagents suitable for our process, the symbol X may include another imidazoline ring, as described more fully below. Shown in the most general way, the compounds contemplated for use herein may be represented by the following formula:

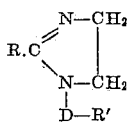

where at least one of the groups R and R' is an aliphatic or cycloaliphatic hydrocarbon group containing from 8 to 32 carbon atoms and otherwise may be hydrogen or a hydrocarbon radical; and D is a divalent organic radical. In the more common reagents, D will be a relatively small organic radical, such as in the following examples of the grouping D—R':

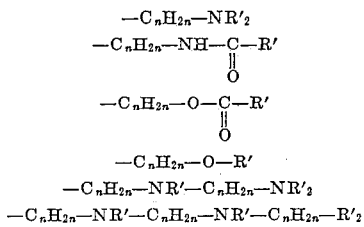

where $n$ is the numeral 1 to 6 and R' is hydrogen or an aliphatic or cycloaliphatic hydrocarbon radical.

In the simplest case, the group R' may be directly attached to the 1-nitrogen atom of the ring, as follows:

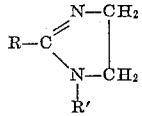

I have found that particularly outstanding oil-in-water demulsifiers result when the imidazoline compound contains basic nitrogen groups in addition to those inherently present in the imidazoline ring. In general, compounds of this type which are most effective are those in which the basic nitrogen group is contained in the radical D in the above formula.

In this case, the products may be represented by the formula:

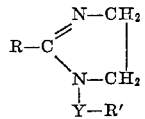

where R and R' are hydrogen or a hydrocarbon radical, and in which at least one of the groups R and R' is an aliphatic or cycloaliphatic hydrocarbon group containing from 8 to 32 carbon atoms; and Y is a divalent organic radical containing amino groups. The group R' may be, and usually is, an amino nitrogen substituent.

Examples of organic radicals which Y—R' may represent are:

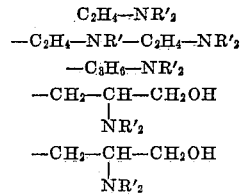

where R' and R have their previous significance.

Of this class of reagents in which an amino group occurs as a portion of the 1-nitrogen substituent, those which are derived, at least theoretically, from the polyethylene polyamines appear to be particularly effective as oil-in-water demulsifiers and are so outstanding as to constitute an invention within an invention. These have the general formula:

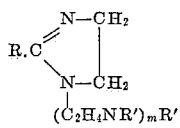

where R and R' have their previous meanings, and $m$ is a small number, usually less than 6.

The preparation of an imidazoline substituted in the 2-position by aliphatic hydrocarbon radicals is well described in the literature and is readily carried out by reaction between a monocarboxylic acid and a diamine, or polyamine, containing at least one primary amino group, and at least one secondary amino group, or another primary amino group separated from the first primary amino group by two carbon atoms. Examples of suitable polyamines which can be employed for this conventional imidazoline synthesis include ethylenediamine, diethylenetriamine, triethylenetetramine, tetraethylenepentamine, 1-2-diaminopropane, N-ethylethylenediamine, N,N-dibutyldiethylenetriamine, 1,2 - diaminobutane, hydroxyethylethylenediamine, and the like. Also included are polyamines such as propylenediamine, dipropylenetriamine, tripropylenetetramine, tetrapropylenepentamine, etc.

Other useful polyamines include the following: N - aminopropylethylenediamine, N-aminobutylethylenediamine, N - aminohexyldiethylenetriamine, and similar polyamines containing at least one primary amino group, separated by two carbon atoms from a second primary or a secondary amino group, but which may also contain other amino groups within the molecule, separated from other such groups by three or more carbon atoms.

When an aliphatic or cycloaliphatic, carboxylic acid containing 9 or more carbon atoms is employed in the above described synthesis, the resulting imidazoline will contain a 2-substituent consisting of an aliphatic hydrocarbon radical containing 8 or more carbon atoms. Suitable oil-in-water demulsifiers may, therefore, be made directly by reaction of acids such as oleic acid, linoleic acid, linolenic acid, erucic acid, talloil fatty acids, naphthenic acids, nonoic acid, and the like, with suitable amines such as those enumerated above. When this condensation is carried out at a temperature of 250° C., or higher, between equal mole proportions of mono-carboxylic acid and polyamine, two moles of water are evolved and the desired imidazoline is formed in almost quantitative yield. Such suitable reagents may be represented by the following formula:

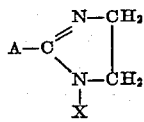

where X may be ethylene amino radicals, hydroxyethylamino radicals, aminoalkyl radicals, alkyleneoxyalkyl radicals, hydrogen, hydrocarbon radicals, cycloaliphatic or aliphatic hydrocarbon radicals or another imidazoline group; and where A is an aliphatic or cycloaliphatic hydrocarbon radical having from 8 to 32 carbon atoms. In the above formulas for imidazolines it should be pointed out that where X is a hydrogen atom, the nitrogen atoms become equivalent, insofar as reaction is concerned, and cannot be distinguished from one another. This is supposed, on theoretical grounds, to result from the mobility of the hydrogen proton, and its ease of transfer from one nitrogen atom to the other. However, where X is an organic substituent other than hydrogen, the nitrogen atoms are no longer equivalent. For the purpose of the present application, the nitrogen atom to which the radical X is attached will be called the 1-nitrogen atom of the imidazoline ring. This is in conformance with the usual chemical convention in numbering heterocyclic ring positions.

As mentioned above, I have discovered that equally suitable oil-in-water demulsifiers may be obtained by introducing into the imidazoline compound an aliphatic hydrocarbon group of proper size as a portion of the substituent attached to the 1-nitrogen atom of the imidazoline ring. Where the aliphatic hydrocarbon group occurs in this position, it is unnecessary that the 2-carbon atom substituent contain 8 or more carbon atoms. It may be, in fact, only a hydrogen atom or a methyl group, ethyl group, phenyl group, or other relatively small hydrocarbon group, although it is not restricted to such small groups. The preparation of imidazoline compounds in which the higher molecular weight hydrocarbon radical occurs as a portion of the nitrogen atom substituent are also readily prepared by methods analogous to those already described. In this case, however, a number of alternative procedures are possible. For example, one may prepare 2-methyl, 1-(octadecylaminoethyl-)imidazoline by reaction of octadecyl aminoethylethylenediamine with acetic acid at a temperature of 250° to 300° C., until two moles of water are evolved for every mole of acetic acid employed. The same reagent may result by the preparation of 2-methyl, 1-aminoethyl imidazoline followed by alkylation with octadecyl bromide and separation of resulting alkylation products to isolate the desired product. For the preparation of 1,2-substituted imidazolines, see King and McMillan, J. A. C. S., 68, 1774 (1946); Kyrides et al., J. Organic Chem. 12, 577 (1947).

Although, as I have specified above, effective chemical demulsifiers are obtained when at least one R group contains from 8 to 32 carbon atoms, I have found that particularly effective reagents and ones having the best solubility characteristics are obtained when R contains at least 10 and not over 20 carbon atoms. Examples of such preferred R groups are decyl, dodecyl, oleyl, stearyl and abietyl.

Examples of suitable substituted imidazolines in which the aliphatic or cycloaliphatic group containing from 8 to 32 carbon atoms is a 2-position substituent, are as follows:

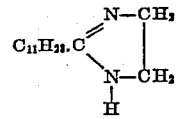

2-undecylimidazoline

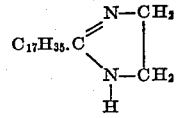

2-heptadecylimidazoline

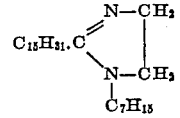

2-pentadecyl,1-heptylimidazoline

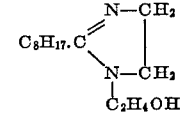

2-octyl,1-hydroxyethylimidazoline

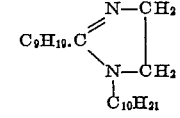

2-nonyl,1-decylimidazoline

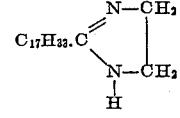

2-oleylimidazoline

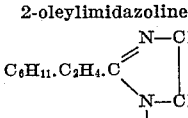

2-cyclohexylethyl,1-methylimidazoline

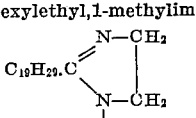

2-abietyl,1-ethyloxyethylimidazoline

Suitable substituted imidazolines in which the aliphatic or cycloaliphatic group containing from 8 to 32 carbon atoms is the 1-position substituent or is a part of this substituent, are exemplified by the following:

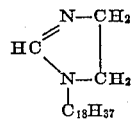

1-octadecylimidazoline

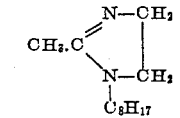

2-methyl,1-octylimidazoline

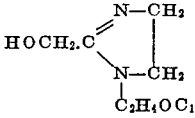

1-dodecyloxyethyl,2-hydroxymethylimidazoline

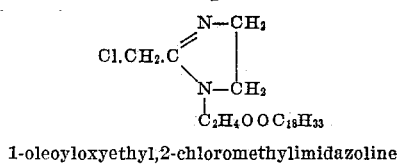
1-oleoyloxyethyl,2-chloromethylimidazoline

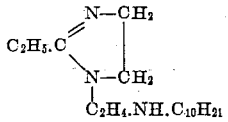
1-N-decylaminoethyl,2-ethylimidazoline

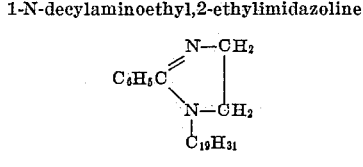
1-abietyl,2-phenylimidazoline

I have pointed out above that imidazolines containing basic nitrogen groups in addition to those occurring in the imidazoline ring are particularly effective oil-in-water demulsifiers. Such products are readily prepared from the commercially available polyethylene polyamines, or from polyamines in which there are three or more amino groups, and in which there is at least one primary amino group separated by two carbon atoms from a secondary or primary amino group. Examples of suitable preferred compounds of this type are the following:

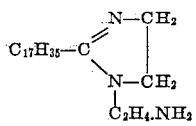
2-heptadecyl,1-aminoethylimidazoline

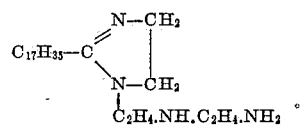
2-heptadecyl,1-diethylenediaminoimidazoline

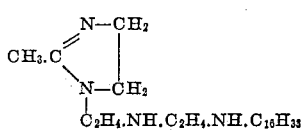
2-methyl,1-hexadecylaminoethylaminoethylimidazoline

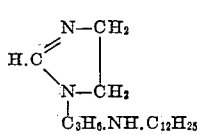
1-dodecylaminopropylimidazoline

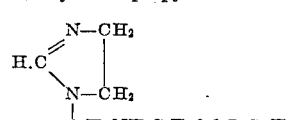
1-(stearoyloxyethyl)aminoethylimidazoline

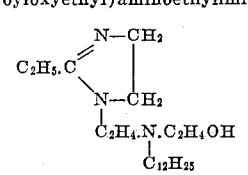
2-ethyl,1-(N,N dodecyl,hydroxyethyl)aminoethylimidazoline

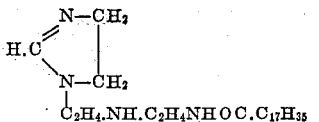
1-stearamidoethylaminoethylimidazoline

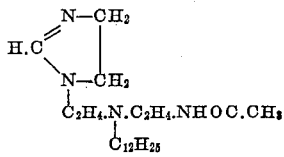
1-(N-dodecyl)-acetamidoethylaminoethylimidazoline

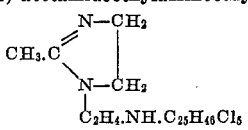
Chloroparaffin alkylation product of 1-aminoethyl, 2-methylimidazoline

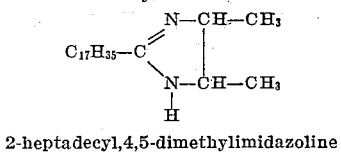
2-heptadecyl,4,5-dimethylimidazoline

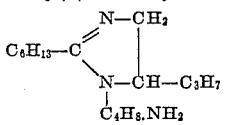
2-hexyl,5-isopropyl,1-aminobutylimidazoline

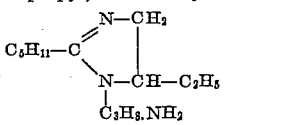
2-pentyl,5-ethyl,1-amino-propylimidazoline

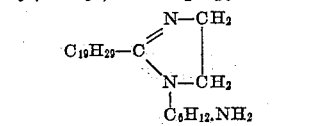
2-abietyl,1-aminohexylimidazoline

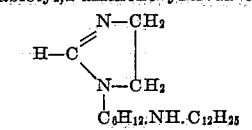
1-dodecylaminohexylimidazoline

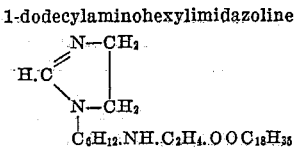
1-stearoyloxyethylaminohexylimidazoline

Although I have shown above the composition of a number of effective oil-in-water demulsifiers which are imidazolines containing at least one aliphatic or cycloaliphatic hydrocarbon radical having from 8 to 32 carbon atoms, I should like to point out that, in general, the most effective reagents and those having the most desirable solubility characteristics are those in which the aliphatic or cycloaliphatic group contains from 10 to 20 carbon atoms. Examples of such preferred groups are decyl, oleyl, abietyl, stearyl, and the like.

The products of the present invention, since they contain an imidazoline ring, may, in general, be alkylated to form either a 1-alkyl-substituted imidazoline, or a quaternary ammonium salt, where the alkyl group is attached to either or both the 1 and 3 nitrogen atoms. For example, using cetyl bromide as a typical alkylating agent, the following reactions may be carried out:

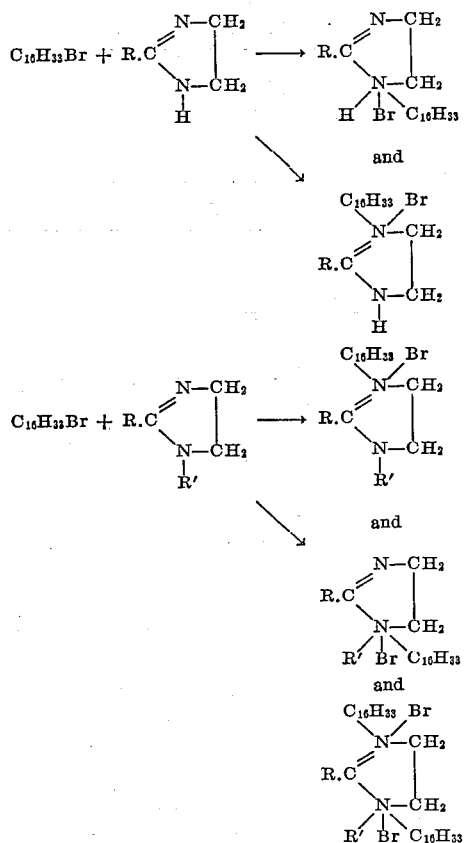

Instead of the cetyl bromide used in the examples above, one may use other alkylating agents such as methyl bromide, benzyl chloride, ethyl sulfate, dichloroethyl ether, chloroparaffin, etc., to obtain equality suitable derivatives of imidazolines which may be employed in the present process.

For details of preparation of various imidazolinium salts, such as those mentioned above, see, for example, Shepard and Shonle, J. A. C. S., 69, 2269 (1947).

While I have described my oil-in-water demulsifiers as imidazolines and have illustrated them above as single ring compounds, it should be pointed out that, in some instances, reagent compounds containing two or more heterocyclic rings, such as two imidazoline rings, may be employed. For example, if one reacts one mole of triethylene tetramine with a mole of stearic acid to form a substituted heptadecylimidazoline, and then reacts this further with another mole of a carboxylic acid at a suitable high temperature, a dimidazoline is obtained.

Such diimidazolines are intended to be included when reference is made to substituted imidazolines herein or in the claims.

Many obvious simple derivatives of the herein described oil-in-water demulsifiers may be prepared which are also effective. For example, I have defined the groups R and R' in the structural formulae above as being members of the class consisting of hydrogen, aliphatic, and cycloaliphatic hydrocarbon groups. Actually, the use of halogenated hydrocarbon groups appears to yield equally effective reagents, and chlorohydrocarbon groups, particularly, are readily introduced during synthesis. Since the chlorine atoms in these groups are relatively non-reactive and yield products with solubilities similar to the hydrocarbon derivative, they do not differ greatly in behavior from the corresponding hydrocarbon derivative.

Imidazolines containing a relatively high molecular weight hydrocarbon radical, and substituted in the 4- and/or 5-ring positions are also effective oil-in-water demulsifiers, but are not so readily prepared from presently available commercial reagents.

Reference to amino compounds herein is intended to include the salts and the anhydro base, as well as the hydrated base, since all forms are obviously present when a water-continuous emulsion is treated with an amine or an amino compound. ("In an aqueous solution of the amine, the anhydro base, $R-NH_2$, the hydrated base, $R-NH_3-OH$, and the two ions are all present." Richter, Textbook of Organic Chemistry, Second Edition, page 252.)

The demulsifiers herein employed are not new products. For example, reference is made to U. S. Patents Nos. 2,466,517, dated April 5, 1949, and 2,468,163, dated April 26, 1949, both to Blair and Gross, the latter of which was subsequently reissued as Re. 23,227, dated May 9, 1950.

Some of the imidazolines included for use in the present process are freely dispersible in water in the free state. Presumably, such systems comprise the reagent in the form of a base, i. e., a substituted ammonium compound. In other instances, the free forms of the reagents are substantially water-insoluble, but the salt forms (e. g., the acetates) are very water-dispersible. In some instances, the reagent in the free form is introduced into an emulsion whose aqueous phase is acidic. In some instances, therefore, the reagent is more desirably employed in the form of one of its salts. For example, the acetate, hydroxyacetate, lactate, gluconate, propionate, caprate, phthalate, fumarate, maleate, benzoate, succinate, oxalate, tartrate, chloride, nitrate, phosphate, sulfate, petroleum-sulfonate, diglycolate, etc., prepared by addition of the suitable acid to the imidazoline, has been found to constitute a reagent which is usually somewhat more soluble or dispersible in water than the original imidazoline body. Being relatively strong bases, the imidazolines readily form such salts; and where the reagent contains basic groupts in addition to the imidazoline ring nitrogen atoms, they may form di- or poly-salts. Probably, in the low concentrations in which they are usually employed such salts hydrolyze or otherwise decompose to some extent, and reach an equilibrium with the acids and other constituents of the emulsion. The reagents in the form of their salts are, if anything, slightly more effective than the simple imidazolines, when used in the present process.

In such instances where the simple imidazoline is not particularly water-dispersible, it may still be possible to employ it in free form and without preparing a salt form, by using some non-aqueous solvent, such an aromatic petorelum solvent, instead of water; or, in instances where the emulsion to be resolved includes an acidic aqueous phase, the salt form may be produced in situ by simply adding the reagent in free form to such acidic emulsion. It is to be understood that reference to the demulsifying agents in these specifications and claims includes the amino bodies in the form of salts of acids, as well as the amino bodies themselves.

As an example of a preferred type of reagent which is effective for use in the present process, the following is submitted:

284 parts (by weight) of stearic acid and 146 parts of commercial, narrow-boiling-range triethylenetetramine were placed in a steel, gas-heated reaction vessel equipped with a stirrer, reflux condenser and take-off condenser. The reactants were brought to 290° C. and held for 2 hours. During this period the condenser coolant was adjusted to hold a vapor temperature of 105° C. at the take-off point. Approximately 36 parts of water were condensed by the take-off condenser during the heating period. The product is a viscous oil at room temperature. It is somewhat soluble in water and very soluble in dilute acetic or hydrochloric acid solutions.

The material may be employed in concentrated form, or it may be diluted with a suitable solvent. Water has frequently been found to constitute a satisfactory solvent, because of its ready availability and negligible cost; but in other cases, non-aqueous solvents have been employed in preparing the finished reagents. Depending upon the nature of the imidazoline and its molecular weight, the solubility may be expected to range from ready water-solubility in the free state to substantial water-insolubility. As stated above, the salts, and especially the acetates, generally show improved water-solubility over the simple imidazolines; and the best results have been obtained, using salt forms thereof which possess appreciable water-solubility. Because my reagents are frequently effective in proportions of the order of 10 to 50 parts per million, their solubility in the emulsion mixture may be entirely different from their apparent solubility in bulk, in water, or oil. Undoubtedly, they have some solubility in both media, within the concentration range employed.

It should be pointed out that the superiority of the reagent contemplated in the present process is based upon its ability to separate the oil phase from certain oil-in-water class emulsions more advantageously and at lower cost than is possible with other reagents or other processes. In certain instances, it has been found capable of resolving emulsions which were not economically or effectively resolvable by any other known means.

In operating the present process to resolve an oil-in-water emulsion, the reagent is introduced at any convenient point in the system, and it is mixed with the emulsion in any desired manner, such as by being pumped or circulated through the system or by mechanical agitation, such as paddles, or by gas agitation. After mixing, the mixture of emulsion and reagent is allowed to stand quiescent until the constituent phases of the emulsion separate. Settling times and optimum mixing times will, of course, vary with the mature of the emulsions and the apparatus available. The operation, in its broadest concept, is simply the introduction of the reagent into the emulsion, the mixing of the two to establish contact and promote coalescence, and, usually, the subsequent quiescent settling of the agitated mixture, to produce the aqueous and non-aqueous emulsion phases, as stratified layers.

The present process is applicable to oil-in-water emulsions which arise in the production of crude petroleum oil. Frequently, the water produced with the oil in certain specific areas contains as much oil as 1,000 parts per million, or, in some cases, 10,000 p. p. m., or even more, which oil is sufficiently stably emulsified so that it will not separate within the space of time available. My reagent may be applied to a solution of this problem in a number of procedures, all of which basically consist in introducing the reagent into the emulsion, agitating such mixture, and finally, allowing the oil particles to coalesce and separate from the water. For example, the reagent may be introduced into the well fluids as they issue from a well and allowed to mix therewith by passage through the surface gathering lines going to a tank or sump; and separation of the oil particles accomplished by quiescent standing of said mixture in said tank or sump. Clear water is then withdrawn from the bottom of such container, or recovered oil is skimmed or otherwise withdrawn from the top thereof. If preferred, the oil-in-water emulsion may be separated from the free petroleum oil before injection of the demulsifier. The demulsification operation in this instance takes place in the waste water disposal system, rather than in the main oil-gathering system, as before.

In some of these oil-field installations, where efficient operation is had, the effluents carry as little as 5 p. p. m. oil, or even less. An effluent carrying 25 p. p. m. or less of oil is not unusual in such applications of the present process, even though no special apparatus or equipment is installed, and the water disposal plants are operated just as they were before introduction of the reagent of the present process.

In a butadiene manufacturing operation, employing heavy petroleum naphthas as raw material and a conventional gas-making plant, the wash box circulating water became badly fouled with the butadiene tar and residual oils from the gas-making operation. In such condition it constituted a distinctly unsatisfactory medium. Its odor was so intense and its content of oily constituents so strongly stain-producing, that abandonment of use was contemplated. Application of the present reagents resulted in resolution of the emulsion, and the recovery of clear water.

In another plant, butylene is passed over a catalyst bed along with steam and a hydrocarbon oil, for the purpose of producing butadiene by dehydrogenation of the butylene. Condensation of the steam in the presence of the oil causes the formation of an oil-in-water emulsion containing up to some 5,000 parts oil per million of water. Addition of the present reagent in proportions approximately 10–20 parts, per million of emulsion, produced a substantially complete stratification of oil and a transparent aqueous layer containing only several p. p. m. oil.

An oil-in-water emulsion comprising petroleum wax, hexane, and water occurs in the de-waxing of petroleum distillates by means of hexane. Such an emulsion has been subjected to a small proportion of the present reagent, with consequent resolution of the emulsion and production of a clear aqueous layer.

Steam cylinder emulsions produced in the lubrication of steam-actuated engines and pumps have been subjected to the action of the present reagent, employing very small proportions of such reagent (of the order of about 10 p. p. m. or less) with favorable results. The water separates in a clear aqueous layer, in such procedures.

In a plant producing GRS-type synthetic rubber by co-polymerizing butadiene and styrene, it was found that decanter water in the styrene system carried small proportions of styrene, emulsified in such water. Application of a minute proportion of the present reagent resolved such emulsions satisfactorily, a clear water being obtained.

Synthetic latex emulsions were passed to waste in the same co-polymer plant when water was used to flush working areas, the waste water being exceedingly milky in appearance because of the presence of dispersed particles of synthetic rubber latex. Introduction of a small proportion of the present reagent into the emulsion produced a clear water effluent.

The cooling water systems of two natural gasoline absorption plants comprised dilute emulsions of absorption oil in water, at the time the present reagent was applied in small proportions to such emulsions. Complete resolution of the emulsions, with the production of oil and a clear aqueous layer, resulted from such application of such reagent, in both instances.

Several examples of emulsion in which oily materials were dispersed in the diethyleneglycol used to dehydrate natural gas were subjected to the present reagent, for example, in proportions less than about 0.1%. The emulsified materials formed a bottom layer within several hours, the supernatant glycol being clear and bright, showing its freedom from dispersed particles. Settling is appreciably accelerated by the application of heat, since diethyleneglycol has an appreciable viscosity.

A dilute furniture polish emulsion, when subjected to reagents of the present invention, was resolved into a clear aqueous layer and an oily top layer. The original emulsion contained petroleum hydrocarbon oil and an emulsifier of unknown composition.

A pipe press water, obtained in the manufacture of clay pipe in a steam-actuated press, carried a minor proportion of oil and some clay. Subjection to a small proportion of the present reagent resolved the emulsion system, and produced a clear aqueous layer.

A dilute dispersion of a commercial emulsified resin paint was subjected to the action of the present reagent. The opaque milky emulsion separated a clear aqueous layer, in a short time, although only very small proportions of demulsifier were used.

A sample of diluted cow's milk was subjected to the action of a small proportion of the present reagent, resulting in the separation of a clear aqueous layer.

A sample of diluted mayonnaise was likewise subjected to the action of a small proportion of the present reagent, resulting in the separation of a clear aqueous layer, on standing.

While heat is often of little value in improving results when the present process is practised, still there are instances where the application of heat is distinctly of benefit. The example involving diethyleneglycol, above, has already described one such instance. Others could be cited. For example, in one application of the present process to the resolution of an emulsion of crude petroleum in water, it was found that operating the system just 20° F. warmer—at 128° F. instead of 108° F.— notably improved the results obtained. In some instances, adjustment of the pH of the emulsion to an experimentally determinable optimum value will materially improve the results obtained in applying the present process.

Agitation may be achieved in various ways. The piping system through which the emulsion is passed during processing may itself supply sufficient turbulence to achieve adequate mixing of reagent and emulsion. Baffled pipe may be inserted in the flow sheet to provide agitation. Other devices such as perforated-chamber mixers, excelsior- or mineral- or gravel- or steel-shaving-packed tanks, beds of stones or gravel or minerals in open ducts or trenches may be employed beneficially to provide mixing. The introduction of a gas, such as natural gas or air, into a tank or pipe in which or through which the mixture of reagent and emulsion are standing or passing is frequently found suitable to provide desired agitation.

It has been found that the factors, reagent feed rate, agitation, and settling time are somewhat interrelated. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered daily in commercial operations.

As an added discovery, it has been found that application of a suitable gas in a procedure approximating that of the froth flotation cell employed in ore benefication, after the present reagent has been added to the emulsion to be resolved, frequently has a favorable influence of totally unexpected magnitude. For example, in the case of the butadiene-plant circulating water emulsion mentioned above, application of the present reagent in the proportion of about 1 part to 10,000 parts of emulsion was required to produce a clear aqueous layer from a sample of emulsion, on several hours' standing. By incorporating the step of subjecting the chemicalized emulsion to the action of air in a sub-aeration type flotation cell, a clear aqueous layer was obtained in a matter of seconds, without added quiescent settling, and with approximately one-tenth as much reagent. Natural gas was found to be as good a gaseous medium as was air, in this operation.

In another application of the aeration technique, a sample of the same emulsion was subjected to the present reagent and the mixture was stirred by paddle. (Actually, the impeller of the flotation cell was used, without permitting the air to flow into the cell from the hollow impeller shaft.) No resolution of the emulsion occurred over several minutes of stirring. Within about 10 seconds after the air was turned into the stirring mixture, by opening the air valve on the hollow impeller shaft, the emulsion was resolved, and the bottom of the flotation cell was visible through the clear aqueous layer produced.

The same favorable effect of aeration was noted in procedures employed in the resolution of the styrene-in-water emulsions mentioned above. The effect of the application of air was to produce almost instantaneously a clear aqueous layer from the chemicalized emulsion.

It should be distinctly understood that such aeration technique, while an important adjunct to the use of the present reagent, in some cases, is not an equivalent procedure. This has been proved by subjecting an un-chemicalized emulsion to aeration for a period of minutes without detectable favorable effect. Addition of the reagent to such aerated emulsion did produce resolution, promptly.

The details of the mechanical structures required to produce aeration suitable for the present purpose need not be given here. It is sufficient to state that any means capable of producing small gas bubbles within the body of the emulsion is acceptable for use. This may be a sub-aeration flotation cell, as mentioned in the foregoing examples. It may be a porous plate, such as a Filtros plate or an Aloxite plate, connected to a source of gas; the gas being delivered into the liquid as bubbles from the pores of such plate, preferably located at or near the bottom of the vessel in which the emulsion is contained. If such plates are used, it is possible to design apparatus in which continuous flow of the chemicalized emulsion over the plate system is realized, the tailings discharge from such apparatus being a clear aqueous liquid, the oil phase being taken off by skimming troughs or other arrangements located within the flotation vessel.

The flotation principle has long been employed in the beneficiation of ores. Many patents in this art illustrate apparatus suitable for producing aeration of liquids. Reference is made to Taggart's "Handbook of Ore Dressing," which describes a large number of such devices.

The principle of aeration has been applied to the resolution of emulsions by Broadbridge, in U. S. Patent No. 1,505,944, and Bailey, in U. S. Patent No. 1,770,476. Neither of these patents discloses or suggests the present invention, as may be seen from an inspection of their contents.

Suitable aeration is sometimes obtainable by use of the principle of Elmore, U. S. Patent No. 826,411. In that ore beneficiation process, an ore pulp was passed through a vacuum apparatus, the application of vacuum liberating very small gas bubbles from solution in the water of the pulp, to float the mineral. A more recent application of this same principle is found in the Dorr "Vacuator."

The manner of practicing the present invention using aeration is clear from the foregoing description. However, for completeness, the following specific example is included. The emulsion is introduced into a sub-aeration type flotation cell, in which an impeller is mounted vertically on a hollow shaft which in turn carries an air valve of suitable design. The air valve may conveniently consist of a short length of solid rod of diameter equal to that of the outside diameter of the hollow shaft, which rod has been turned over a portion of its length, to a diameter slightly less than the inside diameter of the hollow shaft. It may thereby be inserted into said hollow shaft, and serve to exclude air from said shaft. When it is desired to introduce air into said hollow shaft, the rod plug is simply lifted from the shaft in any desired manner, e. g., by hand. The hollow shaft carries, at its lower end, a number of radially-disposed vanes or paddles. Between the intersections of these respective paddles and the hollow shaft, small holes are drilled into the shaft. When the shaft is rotated at appreciable speeds by any suitable source of power, such as an electric motor, air is drawn down the hollow shaft, escapes through these holes, and is beaten into still smaller particles by the action of the paddles. The air then makes its way to the surface, carrying with it the particles of oily dispersed material originally present in emulsified form, when the present reagent is present in the system. Suitable baffles may be positioned in the vessel to achieve a reasonably quiescent collecting zone at the surface of the liquid, from which the accumulation of oil-bearing froth is removed, e. g., by skimming.

In operating this process, it is preferred that the reagent be added to the emulsion in the cell, and the impeller started with the air valve closed. This causes the reagent to contact the emulsified particles. After a short period of such conditioning, the air valve is opened. The separation of the dispersed oil particles then takes place rapidly.

The chemicalizing or conditioning step may be achieved in other ways. For example, if the emulsion is pumped to the flotation cell through a pipe, the reagent may be introduced into said pipe by any suitable proportioning means, such as a proportioning pump. Motion of the liquid through the pipe is commonly sufficient to admix the reagent and the emulsion; so that, when the liquid reaches the cell, aeration may be started at once.

It will be apparent from the foregoing description that the order in which the reagent and the aeration step are applied is relatively immaterial. Sometimes it is more convenient to chemicalize the emulsion and subsequently to apply the aeration technique. In others, it may be more advantageous to produce a strongly frothing emulsion and then introduce the reagent into such aerated emulsion.

As stated previously, any desired gas can be substituted for air. One of the examples above noted contemplates the use of natural gas. Other commonly suitable gases include nitrogen, carbon dioxide, oxygen, etc., the gas being used essentially for its levitation effect. If any gas has some deleterious effect on any component of the emulsion, it will obviously be desirable to use instead some gas which is inert under the conditions of use.

Recapitulating, I have found that oil-in-water emulsions may be effectively resolved by the application thereto of a substituted imidazoline in which a substituent at either or both the 1- and 2-positions of the ring contains an aliphatic or cycloaliphatic hydrocarbon group having from 8 to 32 carbon atoms. Of this broad genus of oil-in-water demulsifiers, there are several sub-classes which may be employed most effectively in my process. Such sub-classes are:

(1) Those in which the 1-position substituent contains the amino group;

(2) Those in which the 1-position substituent is free of amino groups;

(3) Those in the the 4- and 5-position ring carbons are substituted, etc.

Having thus described my invention, what I claim as new and desire to secure by Letters Patent is:

1. A process for breaking emulsions composed of oil dispersed in a non-oily continuous phase, in which the dispersed phase is not greater than 20%, characterized by subjecting the emulsion to the action of a reagent comprising a substituted imidazoline selected from the class consisting of:

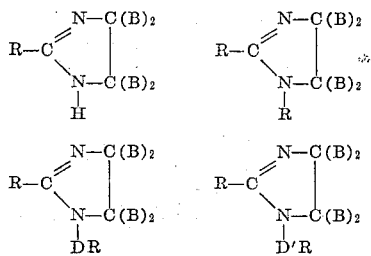

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

2. A process for breaking emulsions composed of oil dispersed in a non-oily continuous phase, in which the dispersed phase is not greater than 5%, characterized by subjecting the emulsion to the action of a reagent comprising a substituted imidazoline selected from the class consisting of:

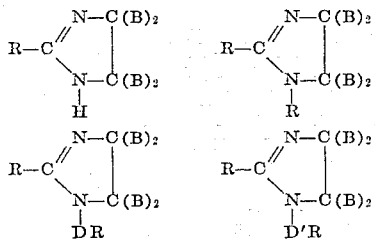

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

3. A process for breaking oil-in-water emulsions, in which the dispersed phase is not greater than 5%, characterized by subjecting the emulsion to the action of a reagent comprising a substituted imidazoline selected from the class consisting of:

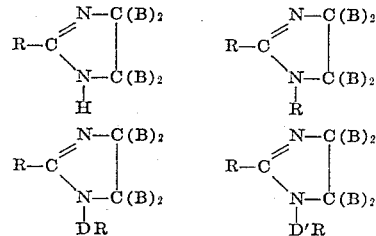

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

4. A process for breaking petroleum oil-in-water emulsions, in which the dispersed phase is not greater than 5%, characterized by subjecting the emulsion to the action of a reagent comprising a substituted imidazoline selected from the class consisting of:

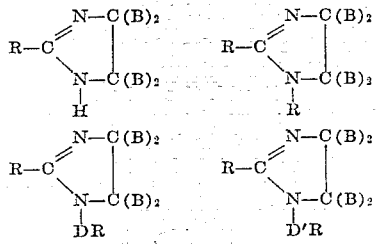

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

5. A process for breaking crude petroleum oil-in-water emulsions, in which the dispersed phase is not greater than 5%, characterized by subjecting the emulsion to the action of a reagent comprising a substituted imidazoline selected from the class consisting of:

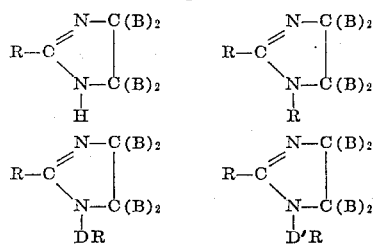

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

6. A process for breaking crude petroleum oil-in-water emulsions, in which the dispersed phase is not greater than 1%, characterized by subjecting the emulsion to the action of a reagent comprising a substituted imidazoline selected from the class consisting of:

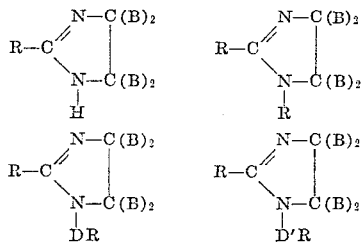

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

7. A process for breaking crude petroleum oil-in-water emulsions, in which the dispersed phase is not greater than 1%, characterized by subjecting the emulsion to the action of a reagent comprising a substituted imidazoline of the formula:

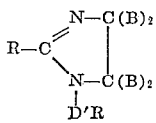

wherein D' represents a divalent organic radical containing less than 25 carbon atoms, composed of elements selected from the class consisting of C, H, O, and N, and containing at least one amino group; and R is a member selected from the class consisting of hydrogen atoms and aliphatic and cycloaliphatic hydrocarbon radicals; with the proviso that at least one occurrence of R contains from 8 to 32 carbon atoms.

8. A process for breaking crude petroleum oil-in-water emulsions, in which the dispersed phase is not greater than 1%, characterized by subjecting the emulsion to the action of a reagent comprising a substituted imidazoline of the formula:

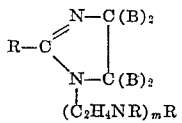

wherein $m$ is a numeral between 1 and 6, and R is a member selected from the class consisting of hydrogen atoms and aliphatic and cycloaliphatic hydrocarbon radicals; with the proviso that at least one occurrence of R contains from 8 to 32 carbon atoms.

9. A process for breaking crude petroleum oil-in-water emulsions, in which the dispersed phase is not greater than 1%, characterized by subjecting the emulsion to the action of a reagent comprising a substituted imidazoline of the formula:

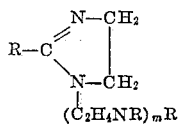

wherein $m$ is a numeral between 1 and 6; and R is a member selected from the class consisting of hydrogen atoms and aliphatic and cycloaliphatic hydrocarbon radicals; with the proviso that at least one occurrence of R contains from 8 to 32 carbon atoms.

10. A process for breaking crude petroleum oil-in-water emulsions, in which the dispersed phase is not greater than 1%, characterized by subjecting the emulsion to the action of a reagent comprising a substituted imidazoline of the formula:

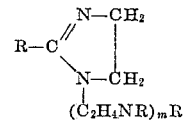

wherein $m$ is a numeral between 1 and 6; and R is a member selected from the class consisting of hydrogen atoms and aliphatic and cycloaliphatic hydrocarbon radicals; with the proviso that at least one occurrence of R is an aliphatic hydrocarbon radical containing from 10 to 20 carbon atoms.

11. A process for breaking emulsions composed of oil dispersed in a non-oily continuous phase, in which the dispersed phase is not greater than 20%, characterized by subjecting the emulsion to aeration and to the action of a reagent comprising a substituted imidazoline selected from the class consisting of:

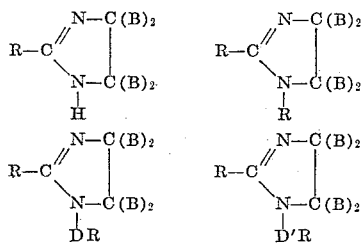

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

12. A process for breaking emulsions composed of oil disposed in a non-oily continuous phase, in which the dispersed phase is not greater than 5%, characterized by subjecting the emulsion to aeration and to the action of a reagent comprising a substituted imidazoline selected from the class consisting of:

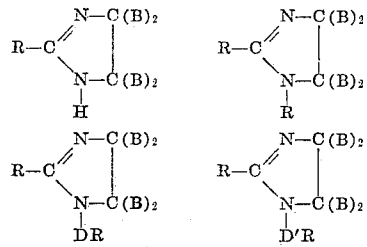

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

13. A process for breaking oil-in-water emulsions, in which the dispersed phase is not greater than 5%, characterized by subjecting the emulsion to aeration and to the action of a reagent comprising a substituted imidazoline selected from the class consisting of:

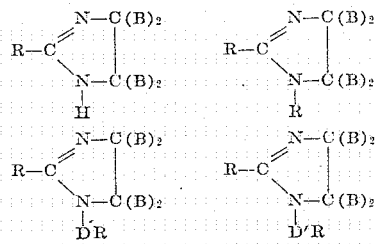

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

14. A process for breaking petroleum oil-in-water emulsions, in which the dispersed phase is not greater than 5%, characterized by subjecting the emulsion to aeration and to the action of a reagent comprising a substituted imidazoline selected from the class consisting of:

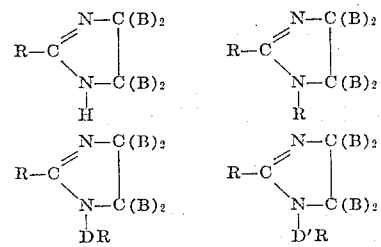

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

15. A process for breaking crude petroleum oil-in-water emulsions, in which the dispersed phase is not greater than 5%, characterized by subjecting the emulsion to aeration and to the action of a reagent comprising a substituted imidazoline selected from the class consisting of:

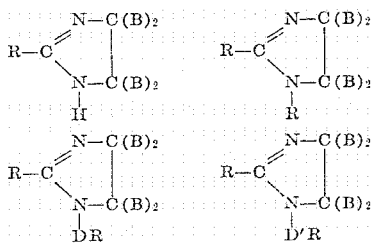

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

16. A process for breaking crude petroleum oil-in-water emulsions, in which the dispersed phase is not greater than 1%, characterized by subjecting the emulsion to aeration and to the action of a reagent comprising a substituted imidazoline selected from the class consisting of:

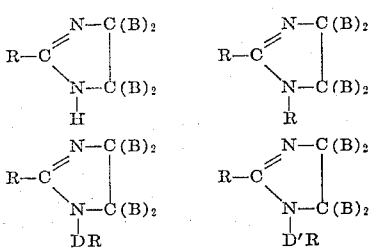

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms.

17. A process for breaking crude petroleum oil-in-water emulsions, in which the dispersed phase is not greater than 1%, characterized by subjecting the emulsion to aeration and to the action of a reagent comprising a substituted imidazoline of the formula:

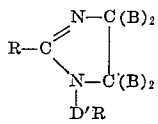

wherein D' represents a divalent organic radical containing less than 25 carbon atoms, composed of elements selected from the class consisting of C, H, O, and N, and containing at least one amino group; and R is a member selected from the class consisting of hydrogen atoms and aliphatic and cycloaliphatic hydrocarbon radicals; with the proviso that at least one occurrence of R contains from 8 to 32 carbon atoms.

18. A process for breaking crude petroleum oil-in-water emulsions, in which the dispersed phase is not greater than 1%, characterized by subjecting the emulsion to aeration and to the action of a reagent comprising a substituted imidazoline of the formula:

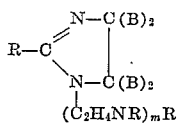

wherein $m$ is a numeral between 1 and 6; and R is a member selected from the class consisting of hydrogen atoms and aliphatic and cycloaliphatic hydrocarbon radicals; with the proviso that at least one occurrence of R contains from 8 to 32 carbon atoms.

19. A process for breaking crude petroleum oil-in-water emulsions, in which the dispersed phase is not greater than 1%, characterized by subjecting the emulsion to aeration and to the action of a reagent comprising a substituted imidazoline of the formula:

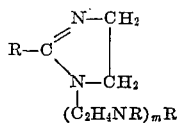

wherein $m$ is a numeral between 1 and 6; and R is a member selected from the class consisting of hydrogen atoms and aliphatic and cycloaliphatic hydrocarbon radicals; with the proviso that at least one occurrence of R contains from 8 to 32 carbon atoms.

20. A process for breaking crude petroleum oil-in-water emulsions, in which the dispersed phase is not greater than 1%, characterized by subjecting the emulsion to aeration and to the action of a reagent comprising a substituted imidazoline of the formula:

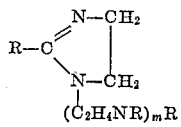

wherein $m$ is a numeral between 1 and 6; and R is a member selected from the class consisting of hydrogen atoms and aliphatic and cycloaliphatic hydrocarbon radicals; with the proviso that at least one occurrence of R is an aliphatic hydrocarbon radical containing from 10 to 20 carbon atoms.

LOUIS T. MONSON.

REFERENCES CITED

The following references are of record in the file of this patent:

UNITED STATES PATENTS

| Number | Name | Date |
|---|---|---|
| Re. 22,963 | Monson et al. | Jan. 13, 1948 |
| 2,246,856 | Monson et al. | June 24, 1941 |
| 2,262,743 | De Groote et al. | Nov. 11, 1941 |
| 2,292,208 | De Groote et al. | Aug. 4, 1942 |
| 2,470,829 | Monson | May 24, 1949 |